United States Patent [19]

Gaasenbeek

[11] 4,226,140

[45] Oct. 7, 1980

[54] SELF-PROPELLED VEHICLE

[76] Inventor: Johannes L. Gaasenbeek, 127 Glen Rd., Toronto, Ontario, Canada, M4W 2W1

[21] Appl. No.: 860,875

[22] Filed: Dec. 15, 1977

Related U.S. Application Data

[63] Continuation-in-part of Ser. No. 751,189, Dec. 14, 1976, abandoned.

[51] Int. Cl.³ .............................................. F16H 37/06
[52] U.S. Cl. ...................................... 74/690; 74/198; 74/681
[58] Field of Search ................. 74/198, 200, 681, 690, 74/691, 740

[56] References Cited

U.S. PATENT DOCUMENTS 2,469,653  5/1949  Kopp ...................................... 74/200

FOREIGN PATENT DOCUMENTS 969138 12/1950 France ...................................... 74/690
1102693 10/1955 France ...................................... 74/691

Primary Examiner—C. J. Husar
Assistant Examiner—Frank McKenzie
Attorney, Agent, or Firm—Ridout & Maybee

[57] ABSTRACT

A skid-steerable self-propelled vehicle has a simple differential connected to the engine, and a variable speed drive connected direct across differential-speed elements of the differential. The vehicle can be steered using a device for adjusting the drive ratio of the variable speed drive.

16 Claims, 5 Drawing Figures

SELF-PROPELLED VEHICLE

This application is a continuation-in-part of my application Ser. No. 751,189 filed Dec. 14, 1976 now abandoned.

BACKGROUND OF THE INVENTION

1. Field of the Invention

The invention relates to skid-steerable self-propelled vehicles, wherein the vehicle can be steered by slowing down or speeding up the wheels, tracks, or other ground reaction members on one side of the vehicle with respect to the ground reaction members on the other side.

2. Description of the Prior Art

In the most commonly encountered forms of skid-steering apparatus, brakes are applied selectively to the left-hand or right-hand ground reaction members. This has the disadvantage that it slows the vehicle and results in power losses. Proposals have also been made in Brown U.S. Pat. No. 2,408,507 and Remy et al U.S. Pat. No. 1,128,818 to employ two coupled differential gears to effect skid steering. However, these arrangements require a steering input drive, independent from the propulsion drive, to be applied continuously while turning the vehicle and the supply of this drive may be inconvenient or the drive may be difficult to control. Moreover, two distinct differential gear mechanisms have to be provided.

SUMMARY OF THE INVENTION

In this invention the steering and propulsion can be accomplished with a single differential gear which has a rotary carrier member driven from the vehicle engine, one or more planetary gears carried on the carrier member, two reaction gears meshing with the planetary gear and driving the left-hand and right-hand ground wheels or other ground reaction members, respectively, a variable-speed traction drive connected between the two reaction gears, and means for adjusting the drive ratio of the variable-speed drive.

With this arrangement, the vehicle can be steered by adjusting the variable speed-drive so as to change the speeds of rotation of the reaction gears and of the ground wheels which are driven by them, the planetary gear or gears simultaneously accelerating their rotation about their own axes, as in the conventional differential, so that an increase in speed of one reaction gear is matched by a decrease in speed of the other reaction gear.

The above arrangement can employ a spur differential gear, or a bevel differential gear, but when a bevel gear is used, this permits co-axial outputs to be taken directly from the reaction gears.

An especially advantageous form of the gear employs as the variable speed drive two spaced rotatory members drivingly coupling with the output shafts from the reaction gears of a bevel differential gear, and a curved body frictionally engaging with the rotatory members. The body rotates about an axis which is tiltable so that the effective diameter of the body at each area of contact with the rotatory members can be varied, and the axis of the body lies wholly externally of region between the rotatory members, so that both rotatory members rotate in the same direction, permitting the rotatory members to be coupled directly to the output shafts, and thus providing a compact arrangement, without intermediate rotation-reversing gears.

BRIEF DESCRIPTION OF THE DRAWINGS

The invention can best be described with reference to the accompanying drawings in which.

DESCRIPTION OF THE PREFERRED EMBODIMENTS

Figure 1:
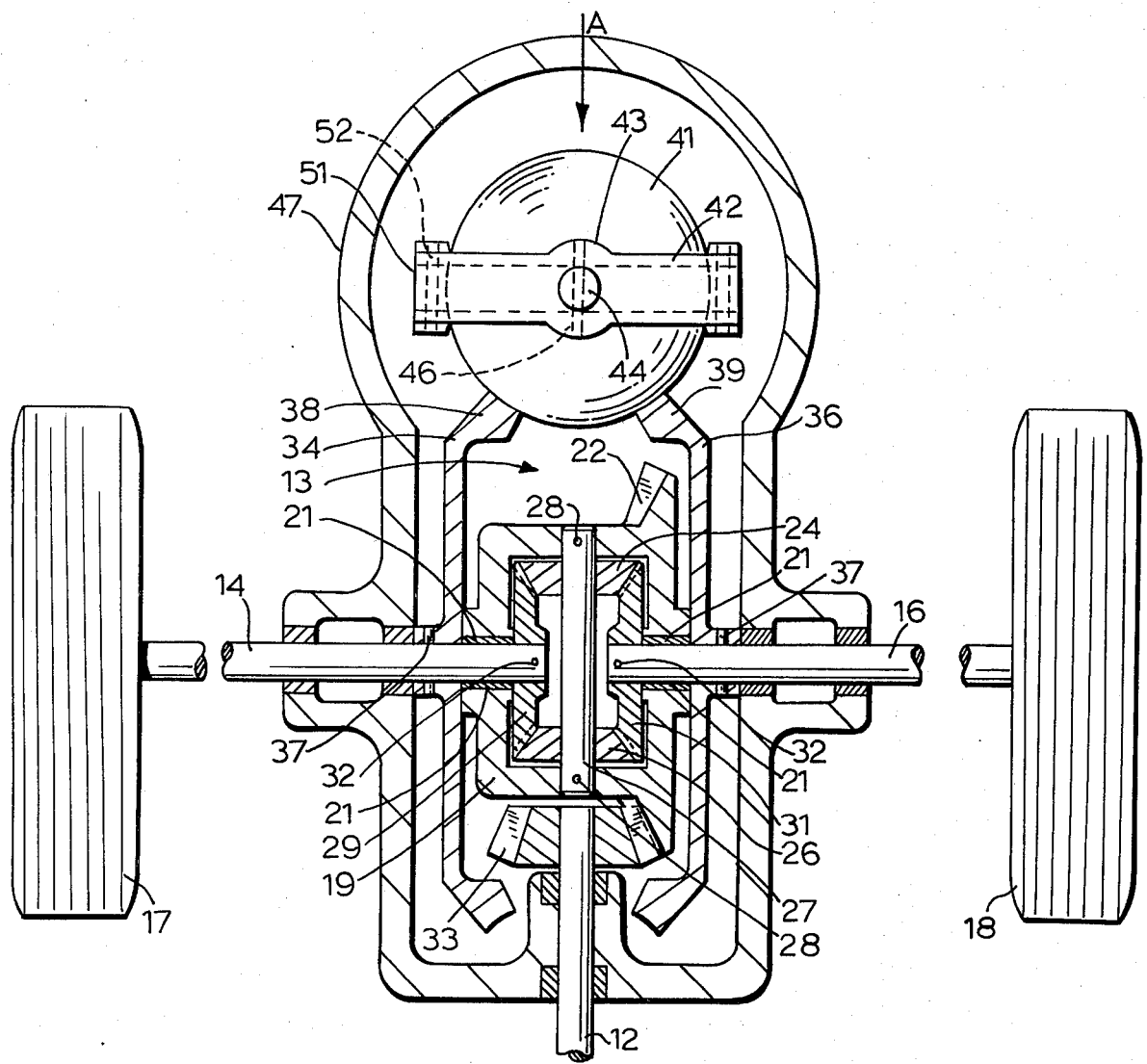
FIG. 1 shows partly in plan and partly in horizontal section one example of steering and propulsion apparatus in accordance with the invention.
Figure 1:
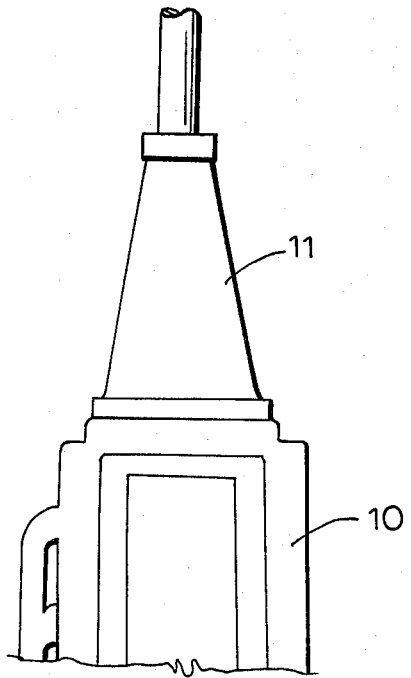

Referring to the drawings, wherein like reference numerals indicate like parts, FIG. 1 shows the propulsion apparatus of a vehicle having a conventional engine 10 and a conventional transmission 11 connected through an input shaft 12 to a bevel differential gear 13. The gear 13 has two co-axial output shafts 14 and 16 connecting to left-hand and right-hand ground wheels 17 and 18.

The differential gear is of the type commonly used in automobile rear axles having a cylindrical carrier 19 rotating freely on bearings 21 on the output shafts 14 and 16. The carrier 19 is formed with a bevel crown gear 22 which is driven by an input bevel gear 33 connected on the input shaft 12.

Two opposed bevel planetary gears 24 and 26 are carried on the carrier 19 on a common carrier shaft 27 pinned by pins 28 at either end to the carrier 19. The planetary gears 24 and 26 are free to rotate about their own axes on the shaft 27.

The planetary gears 24 and 26 intermesh between two opposed bevel reaction gears 29 and 31 pinned to the inner ends of the output shafts 14 and 16, respectively, by pins 32.

In the normal function of such a differential gear, the planetary gears are stationary relative to the carrier 19 when the automobile is steered in a straight-ahead direction, and rotate en bloc with the reaction gears 29 and 31 thus serving to drive each reaction gear 29 and 31 at the same speed. In the conventional automobile, when the vehicle is steered around a corner, by steering the front wheels, one rear wheel tends to slow and the other to speed up, and this is accommodated in the differential gear by the planetary gears 24 and 26 accelerating to a certain speed of rotation about the carrier shaft 27, so that one of the reaction gears 29 and 31 is permitted to speed up while the other reaction gear slows its speed by an equivalent amount.

In the invention, however, the steering is provided for by connecting a variable-speed traction drive between the two output shafts 14 and 16 of the differential through which, when the gear ratio of the variable-speed drive is adjusted so that it is in a speed-reducing drive condition, a small proportion of the torque exerted on one of the output shafts 14 and 16 is transmitted through the variable speed drive to the other of the output shafts, thus tending to slow the one output shaft and speed up the other, whereby the vehicle is steered into a curve. While steering, however, the major proportion of the torque applied by the input shaft is transmitted through the differential gear 13. When the drive is adjusted to a 1:1 ratio for straight-ahead travel, no torque is transmitted through the variable speed drive.

Various forms of variable traction drive may be employed. Examples of preferred variable traction drive include Graham drives, cone-and-ring drives, planetary cone drives, sphere-and-disk drives, double-sphere drives, tilting-ball drives, sphere-and-roller drives, and ball-and-cone drives.

The form of variable-speed drive employed in FIG. 1 has particular advantages of simplicity and of permitting a compact construction.

In this example, roller wheels 34 and 36 are connected co-axially on the output shafts 14 and 16. The hubs of the wheels 34 and 36 are pinned directly to the shafts 14 and 16 by pins 37. The wheels 34 and 36 have flanged rims 38 and 39, profiled at the same radius of curvature as the surface of the body 41, which engage with the surface of a spherial control body 41 on short arcuate lines of contact.

Figure 2:
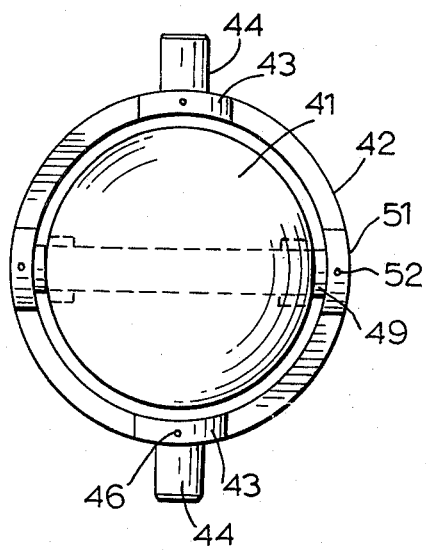
FIG. 2 is a side view, taken in the direction of arrow A in FIG. 1, of the rotating body of revolution and of its supporting and adjustment means.

As best shown in FIG. 2, the body is surrounded by an annular yoke 42 having on opposite sides enlarged bosses 43, within which stub steering shafts 44 are connected with pins 46. The outer ends of the stub shafts 44 can conveniently be journalled on an axis perpendicular to the output shafts 14 and 16 in the upper and lower sides of a housing 47 which entirely surrounds the gear.

One or both of the shafts 44 are connected to a steering wheel or other steering control of the vehicle whereby the shafts 44 and the yoke 42 can be turned.

within the yoke 42, the body 41 is rotatably supported, through bearings 48, on an axle 49 extending at right angles to the shafts 44 and having its opposite ends pinned within enlarged bosses 51 by pins 52.

It will be noted that since the axis of the body 41 passes wholly externally of the region between the wheels 34 and 36 the wheels 34 and 36 are rotatable in the same direction and can thus be coupled directly to the output shafts 14 and 16.

In normal straight-ahead steering of the vehicle, the body 41 is retained with its axle 49 parallel to the shafts 14 and 16, as shown in FIG. 1. In this condition, the lines of contact of the wheel rims 38 and 39 sweep out paths on the surface of the body 41 of the same diameter, so that the gear ratio between the roller wheels 34 and 36 is 1:1, and normally no torque is transmitted through the body 41 between the roller wheels 34 and 36.

Figure 3:
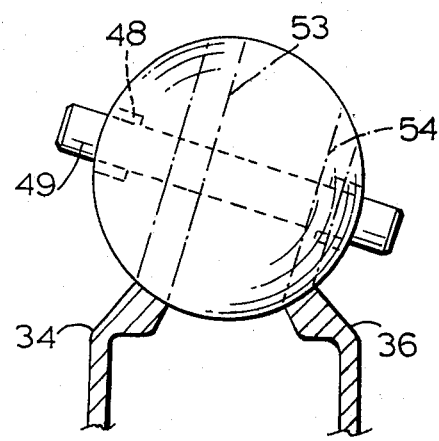
FIG. 3 shows the body in tilted position during steering.

In steering the vehicle the stub shafts 44 are rotated in one direction or the other through a small angle by adjustment of the steering wheel, so that the yoke 42 is tilted about the axis of the shafts 44 and the axle 49 is tilted, as for example in the direction shown in FIG. 3, in a plane co-incident with the output shafts 14 and 16. In this condition, the circular paths 53 and 54 travelled by the rims of the wheels 34 and 36 are of different diameters, so that, in the example of FIG. 3, there is a speed-reducing drive ratio between the roller wheel 34 and the roller wheel 36. The output shaft 16 is thereby slowed, while the output shaft 14 is speeded up, the resulting difference between the speeds of the two shafts being accommodated by rotation of the planetary gears 24 and 26 in the differential gear 13. During the steering adjustment, that is, while the body 41 is actually being tilted, a small proportion of the power applied to the output shaft 14 is transmitted through the speed-reducing drive from the roller wheel 36 to the roller wheel 34. Once the steering adjustment has been accomplished and the body 41 is steady, little if any power is transmitted through the speed-reducing drive.

Figure 4:
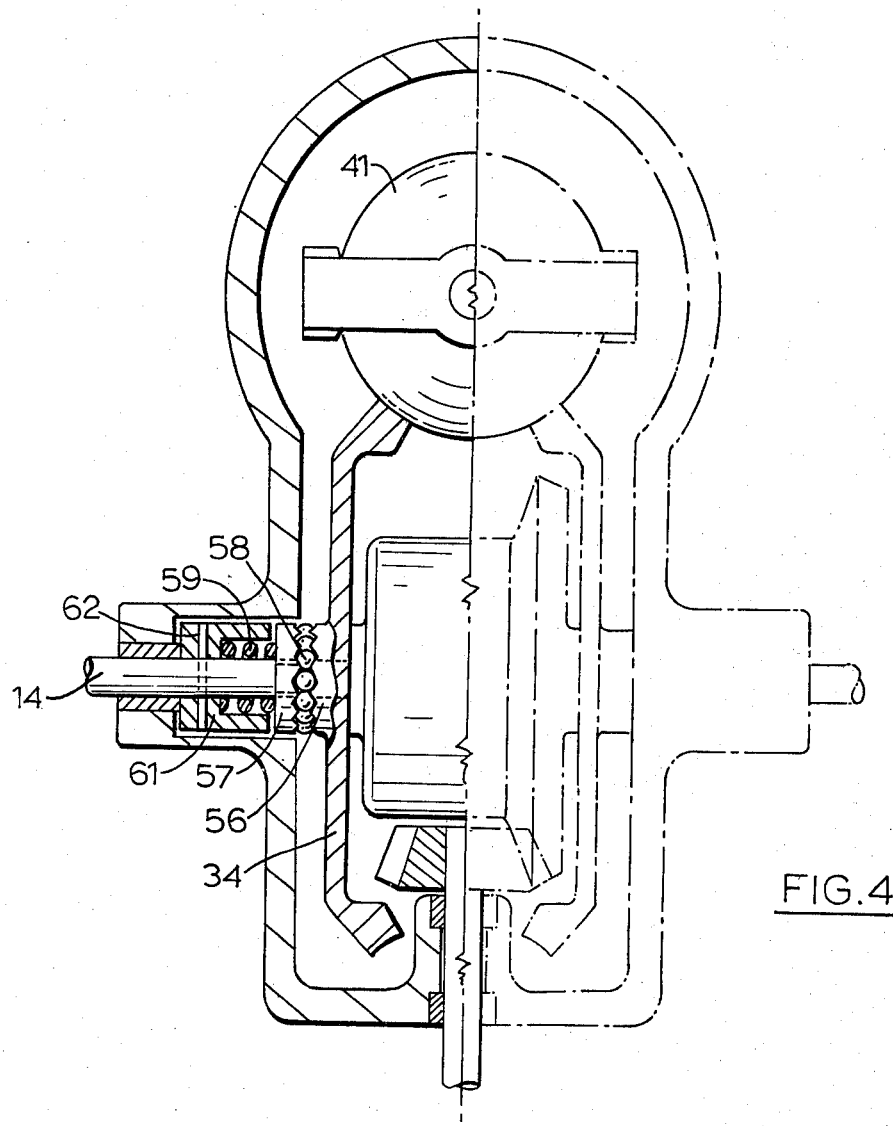
FIG. 4 is a view partly in plan and partly in section of a first modified form of gear in accordance with the invention.

In order to reduce slippage between the roller wheels 34 and 36 and the body 41 when the torque transmitted through the drive changes, a pressure-applying arrangement such as is shown in FIG. 4 can be employed which is responsive to torque applied between the reaction gears 29 and 31 and their respective roller wheels 34 and 36 to urge the roller wheels and the body 41 into greater tractional contact.

In FIG. 4, the arrangement for one side of the differential gear is shown in detail and it will be appreciated that the same structure is also employed on the other side.

In this arrangement, the roller wheel 34 is freely rotatable on and axially slidable on the shaft 14 and is provided with a hub 56 formed on its outer face with an indented profile. Outwardly from the hub 56, a collar 57 is splined on the shaft 14. The collar 57 has an indented face opposing the indented face on the hub 56, and between the two indented faces a series of balls 58 are trapped, the collar 57 being biased toward the hub 56 by a compression spring 59 reacting between the collar 57 and the base of a containing cup 61 which is pinned to the shaft 14 with a pin 62. The strength of the spring 59 is such that a small gap exists between the collar 57 and the cup 61. Thus, even when there is no torque between the reaction gear 29 and the roller wheel 34, the spring 59 acts to provide a minimum constant pressure between the wheel 34 and the body 41. When the torque applied between the reaction gear 29 and the roller wheel 34 increases and the collar 57 is thereby displaced through a small angle in relation to the hub 56, the teeth of the indented faces of the hub 56 and collar 57 tend to ride up over the balls 58, which act in the fashion of a cam. The small gap between the collar 57 and the cup 61 closes, and the reaction of the balls 58 between the collar 57 and the hub 56 urges the roller wheel 34 towards the central, largest diameter portion of the body 41 with a force proportional to the torque between the shaft 14 and the roller wheel 34.

Figure 5:
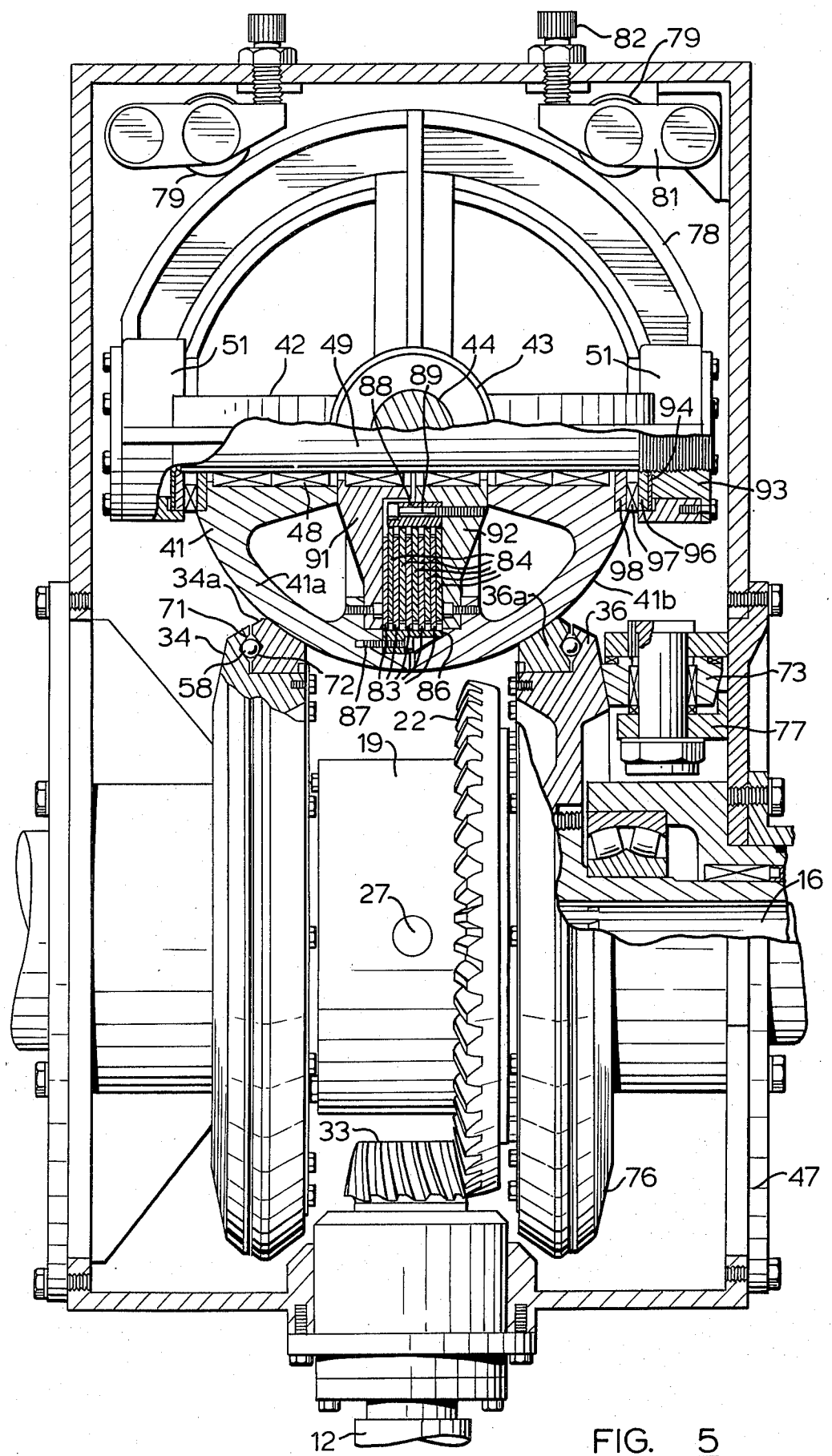
FIG. 5 is a view partly in plan and partly in section of a second modified form of gear in accordance with the invention.

A preferred form of torque-sensitive arrangement is shown in FIG. 5, where the roller wheels 34 and 36 are provided with separate annular rim portions 34a and 36a which engage the surface of the sphere 41. The balls 58 are located in small conical pockets 71 and 72 in the rim portions 34a, 36a and in the corresponding roller wheels 34, 36, respectively. The balls 58 are spaced at small, uniform intervals around the circumference of the wheels 34 and 36. With this arrangement, the roller wheels 34 and 36 do not need to move axially, and when there is a change in the applied torque, slippage between the rim portion 34a or 36a and its associated wheel 34 or 36 results in a camming action between the pockets 71 and 72 and the balls 58 so that there is increased pressure between the rim portion 34a or 36a and the sphere 41. Whereas with the arrangement of FIG. 4, tilting may occur around the balls 58 adjacent the shafts 14 and 16, the arrangement of FIG. 5 reduces this problem.

Each roller wheel 34 and 36 is further stabilized by two bevelled rollers pressing against its outer surface, these rollers being spaced symmetrically above and below the region of contact of the wheels 34 and 36 with the body 41 and the plane occupied by the axes of the shafts 14, 16 and the axis of the sphere axle 49. For convenience of illustration, one of these bevelled pressure rollers 73 is illustrated in FIG. 5 in a displaced position, but it will be appreciated that each of the two pressure rollers 73 associated with each wheel 34 and 36 is positioned at and acts on its respective wheel at a point which is above or below the plane of section illustrated in FIG. 5. Each roller 73 runs on a bevelled surface 76 on its respective wheel 34 and 36, and is journalled in structure 77 connected to the gear housing 47.

In FIG. 5, the bosses 51 are further interconnected by a strengthening arcuate rail 78, and the pressure between the sphere 41 and each wheel 34 or 36 is augmented by pressure-applying rollers 79 each acting on a part of the rail 78 diametrically opposite the region of contact between the wheel 34 or 36 and the sphere 41. Each roller 79 is supported on an arm 81 pivoting on the housing 47 and an adjustable screw 82 urges the arm 81 towards the sphere 41.

It has been found desirable to limit the maximum torque that can be transmitted through the variable-speed drive in order to reduce the risk of damage to the apparatus, for example through excessive frictional wear between the sphere 41 and the wheels 34 and 36. In the embodiment of FIG. 5, an overload protection is provided by employing a sphere 41 that consists of two distinct halves 41a and 41b each engaging a separate roller wheel 34 or 36, respectively. The two sphere halves are interconnected by a friction clutch comprising two sets of metal clutch plates, of which one set of plates 83 are secured to the sphere half 41a and are interleaved with another set of plates 84 secured to the sphere half 41b. Each of these plates is annular and is non-rotatably secured to its respective sphere half, the plates 83 being toothed on their outer circumference and engaging axially-extending ribs provided on the inner surface of a cylinder 86 attached by a bolt 87 to the sphere half 41a, and the plates 84 being toothed at their inner perimeter and engaging ribs formed on an inner cylinder 88 attached by a bolt 89 to the sphere half 41b. Plates 91 and 92 bear on the clutch plate assembly, and these in turn are clamped between the sphere halves 41a and b. At each end of the axle 49, a collar 93 is threaded onto a threaded portion of the axle and presses against a Belleville washer disc spring 94, acting through a bearing plate 96, a friction-reducing bearing 97, and a bearing plate 98 which abuts an axially outer portion of the adjacent sphere half 41a or b. The compression that is exerted through this assembly causes the clutch plate assembly to be pre-loaded. When torque is transmitted through the sphere 41, the pressure-applying balls 58 act through the rim portions 34a and 36a and compress the plates 83 and 84 together. When the steering shaft 44 is in straight-ahead position, and the sphere axle 49 is in the parallel position, at a given torque the plates 83 and 84 can slip, limiting the maximum torque to a safe level. When the steering shaft is turned it is, however, desired that the sphere 41 should transmit high torque, and this is provided for in the present arrangement as when the axle 49 is inclined, there is a large component of the compression between the rim portion 34a or 36a and the opposite pressure-applying roller 79 that acts axially on the assembly of plates 83 and 84.

It will be appreciated that with the arrangement described in detail above, the body 41 need not be spherical but may be, for example, football-shaped. Other bodies of revolution having a smoothly curved part-circular generatrix can also be employed. It will be appreciated that in order to maintain line contact between the rims 38, 39 and the body 41, the tilting axis 44 should be at the centre of curvature of the generatrix. Thus, with a football-shaped body 41, the tilting axis 44 needs to be offset from the rotational axis of the generatrix.

Although there are known speed-reducing drives in which there are a plurality of spherical or part-spherical bodies arranged in contact with driven roller wheels, the form as shown in the accompanying drawings have a single body 41 is preferred. With prior forms it is necessary so to control the tilting movement of each body that all the rotational axes are maintained in exact alignment, otherwise each sphere produces a different drive ratio and these ratios are mutually antagonistic, with the result that there is reduced efficiency and excess wear even at light loads.

The above-described steering and propulsion apparatus, especially when employing an automatic transmission 11 between the engine and the differential gear, can with advantage be applied in the all-terrain vehicle described in applicant's co-pending patent application Ser. No. 705,399 filed July 15, 1976 now U.S. Pat. No. 4,085,697. As with the system employing V-belts described in the prior application the present apparatus can provide stabilized steering for a vehicle, even when the ground wheels on one side of the vehicle encounter an obstacle not encountered by the wheels on the other side, since the ratio of the wheel speeds on opposite sides of the vehicle, and thus also the direction of travel of the vehicle, are maintained constant by the positive coupling the output shafts 14 and 16 through the variable-speed drive. In the event of the ground wheels on one side encountering an obstacle, the corresponding output shaft from the differential will tend to be slowed, but as the speeds of the shafts 14 and 16 are normally maintained in fixed ratio, until varied by adjustment of the variable-speed drive, the other output shaft will also be slowed, and the net effect is to cause a change in the gear ratio of the automatic transmission 11, without the direction of travel of the vehicle being changed. In such case, a torque is transmitted through the body 41 of the variable speed drive which is equal to half the difference in the output torques of the output shafts 14 and 16. However, as the frictional forces applied between the body 41 and the roller wheels 34, 36 do not in themselves exert any moment about the tilting axis 44, no force is transmitted back to the driver's arms through the steering wheel or other steering control.

I claim:

1. A self-propelled vehicle having non-steerable ground reaction members and having a steering and propulsion drive comprising a differential gear having a rotary carrier member rotated by the vehicle engine, at least one planetary gear carried on the carrier member and rotating bodily therewith, two reaction gears meshing with the planetary gear and driving left-hand and right-hand ground reaction members, respectively, a variable-speed traction drive connected between the two reaction gears, comprising a rotatory member coupled to each reaction gear, a body of revolution, one of said body and said rotatory member being of varying diameter along its rotational axis, and means supporting the body in tractional driving engagement with the rotatory members for shifting the position of the body of revolution relative to the rotatory members whereby the tractional drive ratio between the rotatory members can be varied and whereby the vehicle can be steered by adjusting the drive ratio of the variable speed traction drive so as to adjust differentially the speeds of the two reaction gears and of the ground reaction members coupled thereto.

2. A vehicle as claimed in claim 1 having spaced rotatory members in contact with a common body of revolution having a smoothly curved generatrix and an axis of revolution, the axis of the body lying wholly externally of the region between the rotatory members, whereby each rotatory member rotates in the same direction, and the axis of the body tilting in a plane co-incident with the axes of the rotatory members.

3. A gear as claimed in claim 2 wherein the generatrix of the body is at least part-circular, and each rotatory member has a rim flange with a part-circular profile in line engagement with the surface of the body.

4. A vehicle as claimed in claim 2 in which the body is spherical.

5. A vehicle as claimed in claim 3 wherein each rotatory member is co-axial with its respective reaction gear.

6. A vehicle as claimed in claim 2 in which each ground reaction member is driven direct and without intermediate gearing from its respective reaction gear.

7. A vehicle as claimed in claim 2 including pressure-applying means acting to urge the body of revolution towards the rotatory members.

8. A self-propelled vehicle having non-steerable ground reaction members and having a steering and propulsion drive comprising a bevel differential gear having a rotary carrier member rotated by the vehicle engine, at least one planetary gear carried on the carrier member and rotating bodily therewith, two co-axial reaction gears meshing with the planetary gear and driving left-hand and right-hand ground reaction members, respectively, a variable-speed drive connected between the two reaction gears comprising two spaced rotatory members each coupled to a respective reaction gear, a sphere in engagement between the rotatory members and rotating on an axle which is supported on an annular yoke, said axle and its axis of rotation lying wholly externally of the region between the rotatory members and normally parallel to the axis of the reaction gears, whereby each rotatory member rotates in the same direction, and a rotatable steering control shaft co-incident with and normal to the axle of the sphere for tilting the yoke in a plane co-incident with the axes of the rotatory members, whereby the drive ratio between the rotatory members can be varied and whereby the vehicle can be steered by adjusting the drive ratio of the variable speed drive so as to adjust differentially the speeds of the two reaction gears and of the ground reaction members coupled thereto.

9. A vehicle as claimed in claim 8 in which a roller presses on the yoke diametrically opposite each of the regions of contact between the body of revolution and the roller members.

10. A self-propelled vehicle having non-steerable ground reaction members and having a steering and propulsion drive comprising a differential gear having a rotatory carrier member rotated by the vehicle engine, at least one planetary gear carried on the carrier member and rotating bodily therewith, two reaction gears meshing with the planetary gear and driving left-hand and right hand ground reaction members, respectively, a variable-speed drive connected between the two reaction gears, whereby the vehicle can be steered by adjusting the drive ratio of the variable-speed drive to as to adjust differentially the speeds of the two reaction gears and of the ground reaction members coupled thereto, said variable-speed drive comprising two spaced rotatory members each coupled to a respective reaction gear, a body of revolution having a smoothly curved generatrix and an axis of revolution, and means supporting the body for engagement between the rotatory members and for tilting the axis of the body in a plane co-incident with the axes of the rotatory members, whereby the drive ratio between the rotatory members can be varied, the axis of said body lying wholly externally of the region between the rotatory members, whereby each rotatory member rotates in the same direction, and said body comprising two distinct symmetrical parts each associated with a respective roller member, the two body parts being interconnected by a friction clutch and normally rotating together except when the torque transmitted through the clutch exceeds a predetermined limit causing the clutch to slip.

11. A vehicle as claimed in claim 10 in which the clutch comprises circular clutch plates coaxial with axis of rotation of the body.

12. A vehicle as claimed in claim 10 comprising a plurality of clutch plates secured on one body part and interleaved with clutch plates secured on the other body part.

13. A vehicle as claimed in claim 10 including adjacent the rim of each roller member a bevelled roller body pressing against a bevelled portion of the roller member in engagement with the body.

14. A vehicle as claimed in claim 13 including two bevelled roller bodies adjacent and on opposite sides of the region of contact between the rim and the body of revolution.

15. A self-propelled vehicle having non-steerable ground reaction members and having a steering and propulsion drive comprising a differential gear having a rotary carrier member rotated by the vehicle engine, at least one planetary gear carried on the carrier member and rotating bodily therewith, two reaction gears meshing with the planetary gear and driving left-hand and right-hand ground reaction members, respectively, and a variable speed drive connected between the two reaction gears whereby the vehicle can be steered by adjusting the drive ratio of the variable speed drive so as to adjust differentially the speeds of the two reaction gears and of the ground reaction members coupled thereto, said variable-speed drive comprising a rotatory member coupled to each reaction gear, a body of revolution, one of said body and said rotatory member being of varying diameter along its rotational axis, means supporting the body in driving engagement between the rotatory members and for shifting the position of the body relative to the rotatory members whereby the drive ratio between the rotatory members can be varied, and torque-responsive pressure-applying means co-operating with each rotatory member for responding to torque applied to the rotatory member and increasing the pressure of frictional engagement between the rotatory member and the body of revolution, said torque-responsive means comprising each rotatory member having a main portion and a rim portion in contact with the body and mounted for limited circumferential slipping relative to the main portion, and camming means between the main and rim portions tending to shift the rim portion toward the body when slipping occurs.

16. A vehicle as claimed in claim 15 in which the camming means comprise roller bodies retained in pockets defined by camming surfaces.

\* \* \* \* \*